United States Patent
Gomez et al.

(10) Patent No.: US 12,166,567 B2
(45) Date of Patent: *Dec. 10, 2024

(54) WIDEBAND STREAMING L-BAND (WISL) METHODS AND SYSTEMS

(71) Applicant: Satcom Direct, Inc., Melbourne, FL (US)

(72) Inventors: Rodrigo Gomez, McLean, VA (US); Timothy W. Knowles, Alba, TX (US); Ben T. Vuong, Vienna, VA (US); Lasse Thorbro-Steenberg, Cary, NC (US)

(73) Assignee: Satcom Direct, Inc., Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,874

(22) Filed: Jun. 12, 2023

(65) Prior Publication Data

US 2023/0327747 A1 Oct. 12, 2023

Related U.S. Application Data

(63) Continuation of application No. 17/347,489, filed on Jun. 14, 2021, now Pat. No. 11,689,279, which is a continuation of application No. 16/595,770, filed on Oct. 8, 2019, now Pat. No. 11,038,584, which is a continuation of application No. 15/873,058, filed on Jan. 17, 2018, now Pat. No. 10,476,582.

(51) Int. Cl.
*H04B 7/185* (2006.01)
*H04L 65/61* (2022.01)

(52) U.S. Cl.
CPC ......... *H04B 7/18508* (2013.01); *H04L 65/61* (2022.05)

(58) Field of Classification Search
CPC .................. H04B 7/18508; H04L 65/4069
See application file for complete search history.

(56) References Cited

U.S. PATENT DOCUMENTS

| | | | | |
|---|---|---|---|---|
| 6,044,323 | A * | 3/2000 | Yee | H04B 7/18508 701/13 |
| 6,185,409 | B1 * | 2/2001 | Threadgill | H04B 7/18506 455/12.1 |
| 6,201,797 | B1 * | 3/2001 | Leuca | H04B 7/18508 455/12.1 |
| 8,498,268 | B1 * | 7/2013 | Faccin | H04W 36/0011 370/395.2 |
| 10,476,582 | B1 * | 11/2019 | Gomez | H04B 7/2041 |
| 11,038,584 | B2 * | 6/2021 | Gomez | H04B 7/18508 |
| 11,689,279 | B2 * | 6/2023 | Gomez | H04L 65/61 370/316 |

(Continued)

*Primary Examiner* — Afshawn M Towfighi
(74) *Attorney, Agent, or Firm* — Lowndes; Stephen C. Thomas

(57) ABSTRACT

A network management systems (NMS) and methods for automating aircraft wideband streaming L band providing dedicated high data rate communication links from an aircraft fitted with an approved L-band terminal and antenna over a satellite communication network, such as the Inmarsat Swift Broadband network. The systems and methods allow for modifying the L-band terminal wiring to inject a dedicated single channel per carrier (SCPC) signal from an external modem to achieve return data rates in the range of several Mbps over a dedicated leased satellite bandwidth.

18 Claims, 8 Drawing Sheets

(56) References Cited

U.S. PATENT DOCUMENTS

| | | | | |
|---|---|---|---|---|
| 2003/0027551 A1* | 2/2003 | Rockwell | ............ | H04L 63/1416 |
| | | | | 455/410 |
| 2004/0092263 A1* | 5/2004 | Parkman | ............ | H04B 7/18541 |
| | | | | 455/436 |
| 2007/0281609 A1* | 12/2007 | Monte | ................ | H04B 7/18513 |
| | | | | 455/12.1 |
| 2017/0171792 A1* | 6/2017 | Axmon | ............. | H04W 56/0035 |

\* cited by examiner

FIG. 2

| Satellite | Beam Coverage per Lease |
|---|---|
| I-4 | Up to 3 Narrow Beams operating in Standard L-band * |
| AlphaSat-1 | Up to 12 Narrow Beams operating in Extended L-band, or Up to 3 Narrow Beams operating in Standard L-band |

FIG. 3

| Leased Bandwidth (Channel Size) | Data Rate on I4 | | Data Rate on AlphaSat-1 | |
|---|---|---|---|---|
| | Min | Max | Min | Max |
| 800 kHz | 1.8 Mbps | 2.5 Mbps | 2.1 Mbps | 2.8 Mbps |
| 1000 kHz | 2.3 Mbps | 2.8 Mbps | 2.5 Mbps | 2.8 Mbps |

FIG. 6

Terminal List

Lease ID
Lease ID: 1-AMER

Transmissions
TX Inhibit

| Name | IMSI | Aircraft | Position | Beam | Lease Owner | SBB Link Status | WISL Bypass | WISL HPA Mute | Next Scheduled Promotion | Force Promotion |
|---|---|---|---|---|---|---|---|---|---|---|
| NewB | 901121151020061 | Flight2 | Not Available | Unknown | False | Online | No | No | None | PROMOTE |
| NewB | 901121151073000 | Flight1 | Not Available | Unknown | False | Offline | No | No | None | PROMOTE |

WAM Status

| Serial Number | Revision | Temperature | Manual Mode Service Request |
|---|---|---|---|
| NULL | NULL | | FALSE |

Scheduled Promotion Events for NewA:

| Trigger (UTC) | Time to Next Trigger | Action |
|---|---|---|
| | | |
| | | |

Schedule NEW Promotion Event for NewA:

| | | |
|---|---|---|
| Event Date (UTC): | 9/18/2017 | COMMIT |
| Event Time (UTC): | 11:00 | COMMIT |
| Persistent M&C: | Yes | COMMIT |

Event List:

| Information | Major | Minor | Critical |
|---|---|---|---|
| ☑ | ☑ | ☑ | ☑ |

Page Selection:   PREV   1 of 1   NEXT

FIG. 7

Device

| Device Serial Number | 0002 |
|---|---|
| Device Revision | 1.0 |

Status

| NMS Connection Status | NotOk |
|---|---|
| Qlite Health Status | Ok |
| PPPoE Connection Status | NotOk |
| HSD Connection Status | NotOk |
| Temperature | Unavailable |
| WiSL HPA Mute Status | Enabled |
| WiSL Bypass Status | Enabled |

| Modem Tx Status | Mute-Off |
|---|---|
| Modem Rx Status | Demod Unlocked |
| Modem Tx Frequency [MHz] | 1630.3 |
| Modem Rx Frequency [MHz] | 1630.0 |

WiSL Manual Mode Service Request

| Acquire WiSL Service | ☑ |
|---|---|
| WiSL Service Status | Busy : Hello,Admin |

WIDEBAND STREAMING L-BAND (WISL) METHODS AND SYSTEMS

CROSS REFERENCE TO RELATED APPLICATIONS

This non-provisional application is a continuation application of U.S. patent application Ser. No. 17/347,489, filed in the United States Patent and Trademark Office (USPTO) on Jun. 14, 2021, entitled titled "WIDEBAND STREAMING L-BAND (WISL) METHOD AND SYSTEMS", which was published on Sep. 30, 2021 as U.S. Patent Publication No. US 2021-0306068 A1, and which issued as U.S. Pat. No. 11,689,279 on Jun. 27, 2023, the entire disclosure of which is incorporated by reference herein in its entirety; Ser. No. 17/347,489 is a continuation application of U.S. patent application Ser. No. 16/595,770 filed in the USPTO on Oct. 8, 2019 titled "WIDEBAND STREAMING L-BAND (WISL) METHOD AND SYSTEMS" which was published by the USPTO as U.S. Patent Publication No. US 2020-0052777 A1 on Feb. 13, 2020, and which issued as U.S. Pat. No. 11,038,584 on Jun. 15, 2021, the entire disclosure of which is incorporated herein by reference in its entirety; which is a continuation of U.S. patent application Ser. No. 15/873,058 entitled "WIDEBAND STREAMING L-BAND (WISL) METHODS AND SYSTEMS" filed in the United States Patent and Trademark Office (USPTO) on Jan. 17, 2018, and which issued from the USPTO as U.S. Pat. No. 10,476,582 on Nov. 12, 2019, the entire disclosure of which is also hereby incorporated herein by reference in its entirety.

FIELD OF INVENTION

This invention relates to wireless aircraft communications, and in particular to a network management systems and methods for aircraft wideband streaming L band service for providing dedicated high data rate communication links from an aircraft fitted with an approved L-band terminal and antenna over the Inmarsat Swift Broadband network by modifying the L-band terminal wiring to inject a dedicated single channel per carrier (SCPC) signal from an external modem to achieve return data rates in the range of several Mbps over a dedicated leased satellite bandwidth.

BACKGROUND AND PRIOR ART

Inmarsat WISL (wideband streaming L band) currently allocates dedicated spectrum (bandwidth) onboard aircrafts to be used for regional operations. Generally, frequencies between 1 and 2 GHz are referred to as L-band. L-band antennas are small and lightweight, making them especially suited for tactical and mobile operation. The primary L-band constellation is the Inmarsat I-4 BGAN Network, which has a direct-connect into the Inmarsat satellite access stations and Internet. L-band provides global operations, even in adverse weather conditions to provide seamless global network coverage enabling broadband communications to mobile users anywhere in the world. Typical L-band applications can include mobile voice, video and data services (land, air, as well as navigation Systems, and the applications are over different footprints. The spectrum is shared among a footprint. Inmarsat carves out portions of the bandwidth to allow remote users to lease those portions to use part of the spectrum (bandwidth) in dedicated L-Band leases. The user(s) are allowed to use dedicated bandwidth, such that only one user will use one leased bandwidth at a time.

A challenge with using WISL comes from the traveling aircraft having to move from one narrow beam to another. Currently the link between the teleport modems and WISL modems is allocated statically to a single beam, and it gets broken or creates interference when aircraft travels from beam to beam or from satellite to satellite as the aircraft travels between the beams and in effect crossing into different L-band frequencies.

Remote users such as but not limited to systems onboard an aircraft include routers, ISR (intelligence, surveillance and reconnaissance), and the like, currently use Inmarsat (WISL) wideband streaming L band, that require personal onboard the aircraft to manually configure and change between satellite bandwidth leases as the aircraft passes from one beam to another.

A problem with this manual operation is that onboard remotes attached to terminals such as routers and ISR (intelligence, surveillance and reconnaissance), often drop the communication links between the aircraft and remote connections as the aircraft passes from one beam to another.

Currently a plane going on a mission must set up the WAM WISL access modem system manually to allow the ISR to continuously use the bandwidth.

The current systems that use WISL normally have to manually configure the WISL box (plug in computer) and change on the go, where the reconfiguring must be manually operated on the aircraft and at the satellite access station modems.

Having to require the onboard personnel constantly reestablish communication links results in loss of valuable data communications during important missions, as well as the extra work required by the onboard personnel which takes their valuable time away from other important activities onboard the aircraft.

Additional problems also exist with WISL systems. The current WISL system only allows one remote at a time, and requires manual intervention and coordination of onboard and ground personnel to hand-over active use of the lease between multiple aircrafts, or giving priority to one remote specifically. When one aircraft 200 needs to take over the lease to another aircraft 200, the active remote shall disable the active WAM 210, personnel on the ground reconfigures the teleport modems 110, and finally personnel onboard the second aircraft 200 reconfigure their WAM 210 to lock on the shared lease. This would have to be in this specific order and within certain time to prevent interference or extended break in service. Current WISL systems do not have a safe guard to prevent and inadvertent transmission from the aircraft 200, both inside and outside of the leased area. When an aircraft 200 is preparing to enter the leased area, personnel onboard the aircraft 200 could begin transmission prior to entering the lease, causing interference in an adjacent beam. As such, when an aircraft 200 is preparing to leave the leased area, the personnel onboard the aircraft 200 may neglect to mute the transmissions from the WISL system, also causing interference to an adjacent beam.

Currently the ground personnel do not have visibility or situational awareness of the status and health of the remote equipment. Any issues occurring onboard the aircraft 200 such as issues with power levels, IP configuration issues, mismatch modem configurations or user configuration errors, or the plane entering or leaving the lease area.

Satellite communication systems have been proposed over the years but do not overcome the problems addressed above. U.S. Published Patent Application Publications: 2013/0070666; 2014/0286236 and 2016/0204854 to Miller et al. and U.S. Pat. No. 9,184,829 to Miller et al. are generally directed for how a system uses a satellite to establish communications with multiple remotes to establish meshed networks, and deal directly with spectrum.

U.S. Published Patent Application Publication 2012/0009920 to Karabinis is generally concerned with having two satellites sharing the same spectrum in an overlapping area.

U.S. Published Patent Application Publication 2016/0286532 to Karabinis is generally concerned with re-using the spectrum in a way that avoids interference.

U.S. Published Patent Application Publication 2015/0078218 to Karabinis is also generally concerned with reusing spectrum in satellite and terrestrial networks, similar to Inmarsat does with ATC.

Other prior art relating to satellite communication systems have been proposed in U.S. Pat. No. 8,218,476 to Miller; U.S. Pat. No. 8,238,819 to Karabinis; U.S. Pat. No. 9,014,083 to Boltz et al. and U.S. Pat. No. 9,184,829 to Miller et al.

None of the cited prior art allows for management of resources in satellite communication systems addressed above. Thus, the need exists for solutions to the above problems with the prior art.

SUMMARY OF THE INVENTION

A primary objective of the present invention is to provide network management systems and methods for aircraft wideband streaming L band which provide dedicated high data rate communication links from an aircraft fitted with an approved L-band terminal and antenna over the Inmarsat Swift Broadband network by modifying the L-band terminal wiring to inject a dedicated single channel per carrier (SCPC) signal from an external modem to achieve return data rates in the range of several Mbps over a dedicated leased satellite bandwidth.

A secondary objective of the present invention is to provide network management systems and methods for aircraft wideband streaming L band service which provides a management database of lease inventory to allow an administrator to create, modify and remove leases on any satellite region.

A third objective of the present invention is to provide network management systems and methods for aircraft wideband streaming L band service which provides a user a remote inventory control to add, remove and modify remote terminals in the system.

A fourth objective of the present invention is to provide network management systems and methods for aircraft wideband streaming L band service which provides remote status interfaces to query the GRM (global resource manager) database and query and configure the WAM, teleport/SAS (satellite access station) modem for near real-time terminal location, status, and beam information and cross check against lease information.

A fifth objective of the present invention is to provide network management systems and methods for aircraft wideband streaming L band service which provides service operations to schedule the activation and automation of access of a lease with associated lease parameters with the aircraft (or group of aircrafts) and aircraft missions throughout the entire lifecycle of the lease.

The Wideband Streaming L-band (WiSL) is coupled with a Network Management System ("NMS") Functionality and network architecture to enable operations of WiSL services worldwide. The novel NMS functionality includes several novel features such as WAM remote status, remote inventory, lease inventory, schedule and persistent management.

For WAM Remote Status, the NMS (Network Management System) can have an automated process to gather current status and location of the aircraft from the Inmarsat core GRM (global resource management). This process can be used by the NMS to identify when the plane is active, and whether it is in-transit or arrived to the beam where the WiSL lease is booked. The NMS can be configured to failover to the backup GRM in a different Inmarsat POP if the primary GRM fails.

For remote inventory, the user can add, remove and modify remote terminals in the system. This can include a database with the SIM card number of the SBB terminal authorized to use the leases.

For lease management, the system can have a management database that allows the administrator to create, modify and remove leases in any beam and any satellite. The leases can be single beams or clusters of beams that operate dedicated spectrum.

For the schedule, the NMS can be configured scheduled activation or deactivation for mission planning purposes. The schedule can be allocated to a remote or group of remotes, and assigned to specific lease or groups of leases.

The NMS can also manage and control the SAS (ground station) modems to the specific configuration necessary for linking the specific remotes to each mission, based on the scheduler's parameters.

The schedule can also help users plan missions with priority and preemption of remotes when competing for the same lease. This works when a remote needs to handover the mission to another remote, or a remote has priority over other remotes in the same beam.

If enabled for specific customers, manual mode can override the schedule.

For persistent management through the COMSAT MPLS, the NMS maintains positive control of the SAS (ground station) modems to ensure that they are properly configured and enabled/disabled when a remote needs to become active/inactive.

When the remote becomes active, the NMS maintains persistent communication with the remote via the control channel to monitor status and maintain positive control of the remote.

When the remote gets to the leased beam, the NMS automatically sends the required configuration parameters of the specific link to the remote, and maintains quality assurance of the process to ensure the communication is maintained during the entire mission.

Every modification and status change can be logged in the system for audit and troubleshooting purposes.

During the entire mission, alarms and status indicators are captured, displayed and emailed.

A network management method for wideband streaming L band (WISL) service on aircrafts, can include the steps of providing an aircraft with an antenna connected to a high speed data terminal; providing an L Band modem in the aircraft; providing a satellite for establishing a communication link between the aircraft antenna and a ground station, and network managing the communication link between the L Band modem on the aircraft and the satellite and remote locations in order to keep the communication link active while the aircraft travels between different beams controlled by different L-band leases.

The step of network managing can include the step of controlling the network managing through a ground station having a server.

The network managing step can include the step of providing a management database of lease inventory to allow an administrator to create, modify and remove leases for different satellite regions.

The different leases can be selected from single beams and clusters beams that operate with a selected spectrum.

The network managing step can include the step of providing a user with a remote inventory control to add, remove and modify remote terminals.

The invention includes a control that can include the step of providing a database that includes the identification number of the terminal authorized to use the lease, an IP address assigned to a remote, and associate different terminals with appropriate leases.

The network managing step can include the steps of providing a remote status interface to query the aircraft L-band modem, and providing a database for terminal location and beam information and to cross check against lease information.

The step of providing the remote status can further include interfaces to query a teleport modem and the aircraft L-band modem and the database for near real-time terminal location and beam information and cross check against lease information.

The network managing step can include the step of providing for service operations to schedule activation of a selected lease with the aircraft.

The step of providing the service operations further can include the step of providing the service operations to schedule the activation of the selected lease along with aircraft missions throughout an entire lifecycle of the lease.

The network management method can further include the step of providing an IP-based packet-switched communications network that provides a symmetric 'always-on' data connection of up to 432 kbit/s per channel for the communication link.

The network management method can further include the step of providing an IP-based packet-switched communications network that provides a symmetric 'always-on' data connection of up to 650 kbit/s per channel for the communication link.

The network management method can further include the step of providing return data rates in the communication links up to approximately 2.8 Mbps.

The network management method can further include the step of providing frequencies between 1 GHz and 2 GHz as the L-Band.

The step of providing the L band modem can include the step of inserting the L Band modem between the antenna and the terminal.

The inserting step can include the steps of cutting existing connector lines between the antenna and the terminal and attaching the L Band modem to the cut connector lines between the antenna and the terminal.

A network management system for aircraft wideband streaming L band, can comprise an L Band modem connected between an antenna and a high speed data terminal in an aircraft and a remote ground based network manager for managing a communication link between the L Band modem on the aircraft and a satellite and at least one remote location, in order to keep the communication link active while the aircraft travels between different beams controlled by different L-band leases.

The L-Band can include frequencies between approximately 1 and approximately 2 GHz.

The system can operate on a network that provides a symmetric 'always-on' data connection of up to 650 kbit/s per channel for the communication link, and the communication link provides return data rates up to approximately 2.8 Mbps.

The L Band modem can be wired to the antenna and the data terminal.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 2 is a table showing maximum allowable number of beams that can be clustered with satellites per a WiSL lease.

FIG. 3 is a table showing bandwidth return on channel leases offered by different Inmarsat satellites.

FIG. 6 shows a NMS (network management system) automated scheduler using the network management system of FIG. 1.

FIG. 7 shows a screen shot showing device status using the network management system of FIG. 1.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

As discussed above, many systems have been proposed for satellite communication systems, but fail to overcome the problems with the prior art referenced above. The prior art listed references, which include: U.S. Published Patent Applications: 2013/0070666; 2014/0286236 and 2016/0204854 to Miller et al. and U.S. Pat. No. 9,184,829 to Miller et al.; 2012/0009920 and 2016/0286532 and 2015/0078218 to Karabinis; 2016/0286532 to Karabinis, as well as satellite communication systems have been proposed in U.S. Pat. No. 8,218,476 to Miller; U.S. Pat. No. 8,238,819 to Karabinis; U.S. Pat. No. 9,014,083 to Boltz et al. and U.S. Pat. No. 9,184,829 to Miller et al., all of which are incorporated by reference in their entirety. These references have referred to satellites and communications that can use prior art components, some used in the subject invention, but fail to overcome the deficiencies as referenced in the background section.

Figure 1:
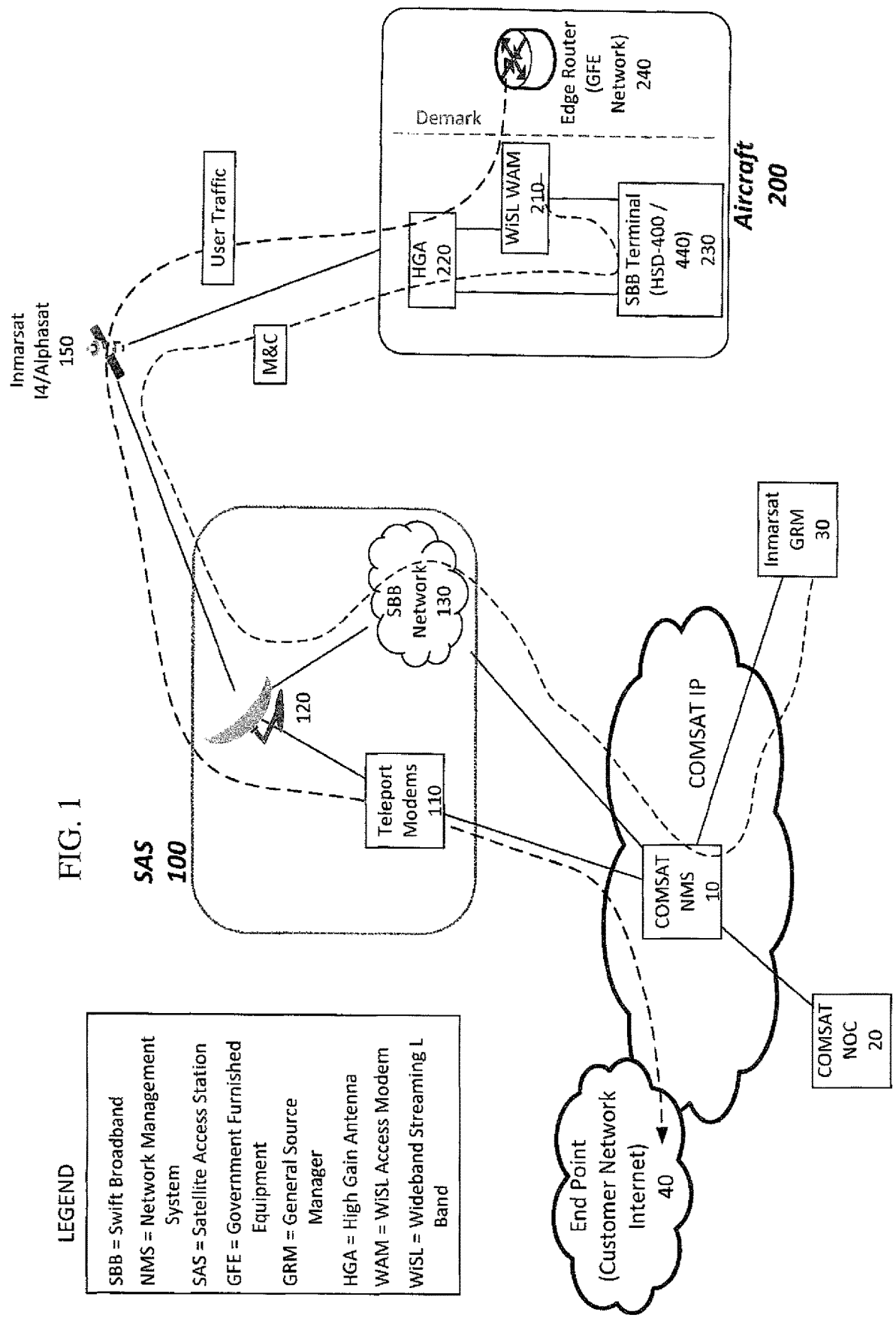
FIG. 1 shows an overview of the aeronautical network architecture schematic using the novel network management system.

FIG. 1 shows an overview of the aeronautical network architecture schematic using the novel network management system 10.

A list of components used in FIG. 1 will now be described.

10 Comsat NMS-network management system to request satellite resources; configure, manage, and monitor Satellite Access Station (SAS) modems and aircraft modems (identified by IMSI); and assign resources to a specific WAM for accessing the customer leased satellite bandwidth.

20 COMSAT NOC refers to Network Operations Center. Systems and Personnel that operate the COMSAT MPLS, configure the NMS, coordinate leases configurations with Inmarsat, and management and control links with the SAS modems and aircraft modems.

30 Inmarsat GRM-global resource manager allocate the satellite resources. Provides an interface for COMSAT Network Management System (NMS) to connect and manage the WAM and lease groups by associating the International Mobile Subscriber Identity (IMSI) used with the SBB terminal; Provides the COMSAT NMS with real-time information such as the status of the active beam, active mobile terminals, and terminal locations.

40 customer network internet, such as internet connections or private customer network.

100 SAS-satellite access station.

110 teleport modem(s).

120 satellite dish.

130 SBB network-Swift Broadband network.

150 satellite, such but not limited an Inmarsat or 14 or AlphaSat-1.

200 aircraft, such as military surveillance aircraft.

210 WISL WAM-wideband streaming L Band wideband aero modem.

220 HGA-high gain antenna(s) which can include microantennas as small as approximately 5 inches high, such as but not limited to AMT-50, AMT-700, or AMT-3800, and the like.

230 Terminals (or SBB Modem) such as HSD (High-speed Data Transceiver)-400/440 Swift Broadband terminal, routers, ISR (intelligence, surveillance and reconnaissance).

240 GFE Network, government furnished equipment, such as routers, crypto, and the like.

M&C Remote Management and Control link.

In the Figures, user traffic link can refer to the path that user traffic (ISR, encrypted data, etc.) follows when transmitted in and out of the airplane into the customer network.

Referring to FIG. 1, there are several main components. The network management system 10 requires an L-band lease on a satellite 150, such as but not limited to an Inmarsat-4 or Alphasat satellite. The network management system 10 further requires aircraft equipment (that is usually customer furnished) approved for operation with WiSL onboard an aircraft 200, such as but not limited to a High-gain antenna (HGA) system 220 such as but not limited to a AMT-50, AMT-700, or AMT-3800, a Swift Broadband (SBB) terminal 230, such as a HSD-400 or HSD-440 SBB terminal, Wide Band Streaming L Band (WiSL) aero modem (WAM) 21.

Additionally, the network management system 10 requires a ground located Global Resource Manager (GRM) 30, such as but not limited to an Inmarsat GRM to allocate resources of the satellite 150. The GRM 30 can be used to provide the information necessary for Network Management System (NMS) 10 to connect and manage the WAM 210 and lease groups by associating the International Mobile Subscriber Identity (IMSI) associated with the SBB terminal, and provides the Network Management System (NMS) 10 with real-time information such as the status of the active mobile terminals within the active beam, and terminal locations.

The Network Management System 10 has the capability to request satellite resources 150; configure, manage, and monitor Satellite Access Station (SAS) 100, modems 110 and aircraft modems (identified by IMSI); and assign resources to a specific WAM 210 for accessing the customer leased satellite bandwidth.

The Network Management System 10 uses a SAS-satellite access station, 100 such as but not limited to a Paumalu SAS and Fucino SAS), are used as the WiSL satellite gateway to access the satellite 150, and collocated (hosted) gateway modem and associated routing equipment which includes but is not limited to routers, switches and firewalls at the Satellite Access Station (SAS) 100.

The Network Management System 10 further uses a terrestrial IP network/backhaul using a private connection, such as but not limited to MPLS (multiprotocol level switching) and SONET (synchronous optical networking) to interconnect the different elements of the system that are located in different geographic locations (SAS 100, COMSAT NOC 20, Inmarsat GRM 30, Customer network 40).

Figure 4:
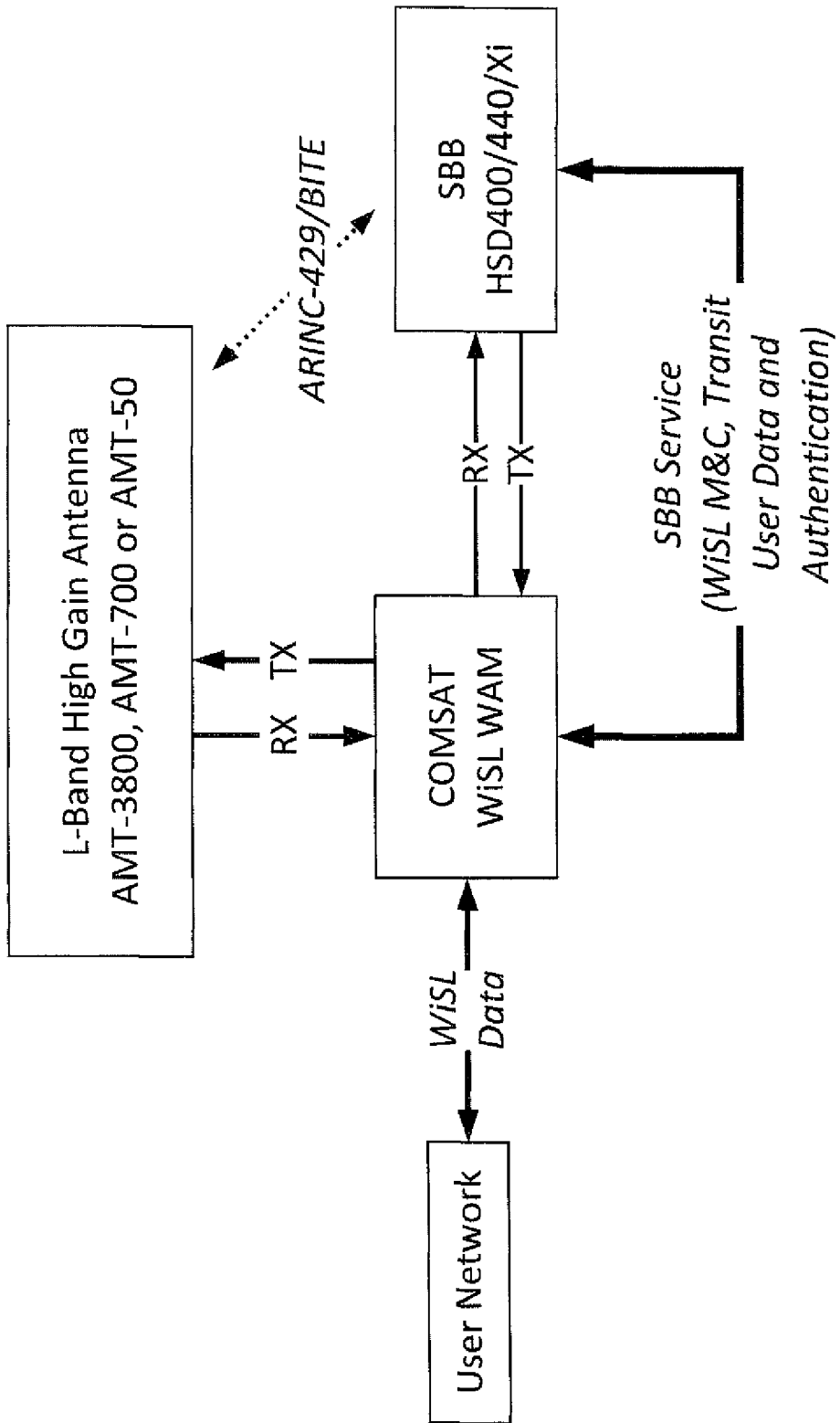
FIG. 4 shows an aircraft wiring diagram for used with the aeronautical network architecture schematic of FIG. 1.

Referring to FIG. 1, the Network Management System (NMS) 10 enables and controls a dedicated high data rate communication link from an aircraft 200 fitted with an approved High-Gain L-band terminal 230 and antenna 220. With a modification of the L-band terminal wiring (as shown in FIG. 4) the COMSAT WiSL WAM 210 inject a dedicated single channel per carrier (SCPC) signal, achieving return data rates in the range of several Mbps (between approximately 1.8 Mbps and approximately 2.8 Mbps as shown in FIG. 3, which are significantly higher than what is possible with a standard L-band terminal).

The SCPC (single channel per carrier) links can be established over dedicated, leased satellite bandwidth. In the general case, this bandwidth supports different forward and return frequency pairs separated into different beams with discrete geographic boundaries. The aircraft terminal 230 can transmit and receive in L-band.

At the teleport 100, the system transmits and receives using the C-band feeder link. The remote management and control (M&C) of the remote system is implemented using Swift Broadband (SBB) as the transport link.

The L-Band generally includes frequencies between 1 GHz and 2 GHz and are useful for mobile voice, video and data services, and navigation systems.

C-Band can include microwave frequencies between 4 GHz and 8 GHz, and can be useful for distribution of video services, VSAT voice, video and data networks, fixed satellite services, and the like.

Swift Broadband (SBB) can include IP-based packet-switched communications network that provides a symmetric 'always-on' data connection of up to approximately 432 kbit/s per shared channel, and up to approximately 650 kbit/s per dedicated channel.

Swift Broadband uses the narrow spot beams of the Inmarsat-4 (I-4) and Alphasat satellites. Features of the service include: Standard IP data—currently up to two channels per aircraft; Up to 432 kbit/s per channel over a high-gain antenna and up to 332 kbit/s over an intermediate gain antenna Streaming IP data on demand at 32, 64, 128, 256, 384, and 650 kbit/s which can be combined for higher rates; simultaneous voice and high-speed data; packet-switched data (TCP/IP) and ISDN; circuit-switched voice and VoIP (Voice Over Internet Protocol).

Referring to FIG. 1, the novel invention can provide channels (n×100 kHz forward and return; e.g. 200 kHz forward and 800 kHz return) on a satellite 150, such as but not limited to an Inmarsat-4 or Alphasat satellite. This bandwidth can be provided to the remote terminals in a lease group on one or a cluster of narrow spot beams.

An L-band lease is a reserved segment of RF (radio frequency) spectrum that is dedicated to a specific customer. The invention provides the flexibility for any terminal authorized in the lease group to access the leased bandwidth as long as only one terminal is active at any given time. This bandwidth can be dedicated to the customer procuring the service and will not be available for re-use by other services (such as but not limited to Inmarsat services) and/or customers. The bandwidth used is leased in each beam where the service is required.

Regarding spectrum allocation, the L-band lease is not an Inmarsat managed service like BGAN (the Broadband Global Area Network). The Network Management System 10 is configured with a series of link budget parameters for the specific terminal allowed in the lease, area of operation and bandwidth requested; then, provides a preliminary design detailing the parameters necessary to close the link and the expected performance throughout the required coverage area. When the lease starts, Inmarsat can provide the necessary satellite power and bandwidth to support the link budgets provided in the design outline. The actual data rate and performance of the link can depend on the configuration of the WAM, the implementation details on the specific aircraft, and the area of operation with respect to the narrow beam and the satellite footprint.

While the capacity can remain allocated to the specific beams in the WiSL (Wide Band Streaming L-Band) lease, on case-by-case, approval can be granted for the transfer of capacity to other beams. Any such transfer request can be subject to availability of spectrum at the time of order. A minimum lease duration can also be required.

Two or more narrow beams can be clustered and assigned to a WiSL lease. The lease clusters can be subject to satellite resource availability.

FIG. 2 shows the maximum allowable number of beams that can be clustered per a WiSL lease. The I-4 is generally a constellation of 3 satellites. Referring to I-4, a case by case consideration can be required for more than 3 Narrow Spot Beams on an I-4 satellite.

FIG. 3 shows Dynamic L-band Lease (DLL) Bandwidth Return Channel Leases offered by an I-4 satellite and AlphaSat-1 satellite. The data rates can vary based on aircraft location and physical conditions of the installation.

FIG. 4 shows an aircraft wiring diagram for used with the aeronautical network architecture schematic of FIG. 1. The Inmarsat type-approved SBB (Swift Broadband) terminals represent a significant population of the deployed user terminals capable of operating the WiSL (Wideband Streaming L-Band) service. Users with SBB high-gain antennas (such as but not limited to AMT-3800, AMT-50 or AMT-700) can have enough uplink power to close the link as required. Change to the SBB terminal such as but not limited to changing a component in the terminal transmission path can require a delta type approval, which means Inmarsat engineers need to review the design and approve the proposed physical modifications of the already approved terminal prior to using it on the satellite to ensure the transmission characteristics are not harmful to the satellite.

As an example, changing the diplexer within the terminal would require a delta type approval. The installation of the WiSL system onboard the aircraft requires a modification of the IFL (Interfacility) cables by inserting the WISL WAM 210 between the High Gain antenna 220 and the SBB terminal 230.

Currently, A High Gain antenna 220 can be directly connected by IFL cables to an SBB terminal 230. For the invention, these cable connections can be cut, followed by the WISL WAM 210 spliced between the High Gain antenna 220 and the SBB terminal 230.

Referring to the ground system of FIG. 1, the patent application Assignee (COMSAT) existing network infrastructure can be used to provide the landing of COMSAT WiSL signals at the SAS (Satellite Access Station) 100 teleports 110, backhaul services of customer traffic and remote management/NMS connectivity.

The SAS (Satellite Access Stations) where COMSAT's Paumalu, Hawaii POP operates can be used to land Americas and Asia-Pacific traffic. COMSAT's Fucino, Italy POP can be used to land EMEA (Europe, the Middle East and Africa) traffic. Both POPs can be equipped with the baseband equipment such as but not limited to modems, routers, and network security as well as dedicated network connectivity for user and management traffic. All equipment can be managed remotely and its operation is fully automated by the NMS (Network Management System) 10 to establish WiSL (Wideband Streaming L-Band) connectivity.

Figure 5:
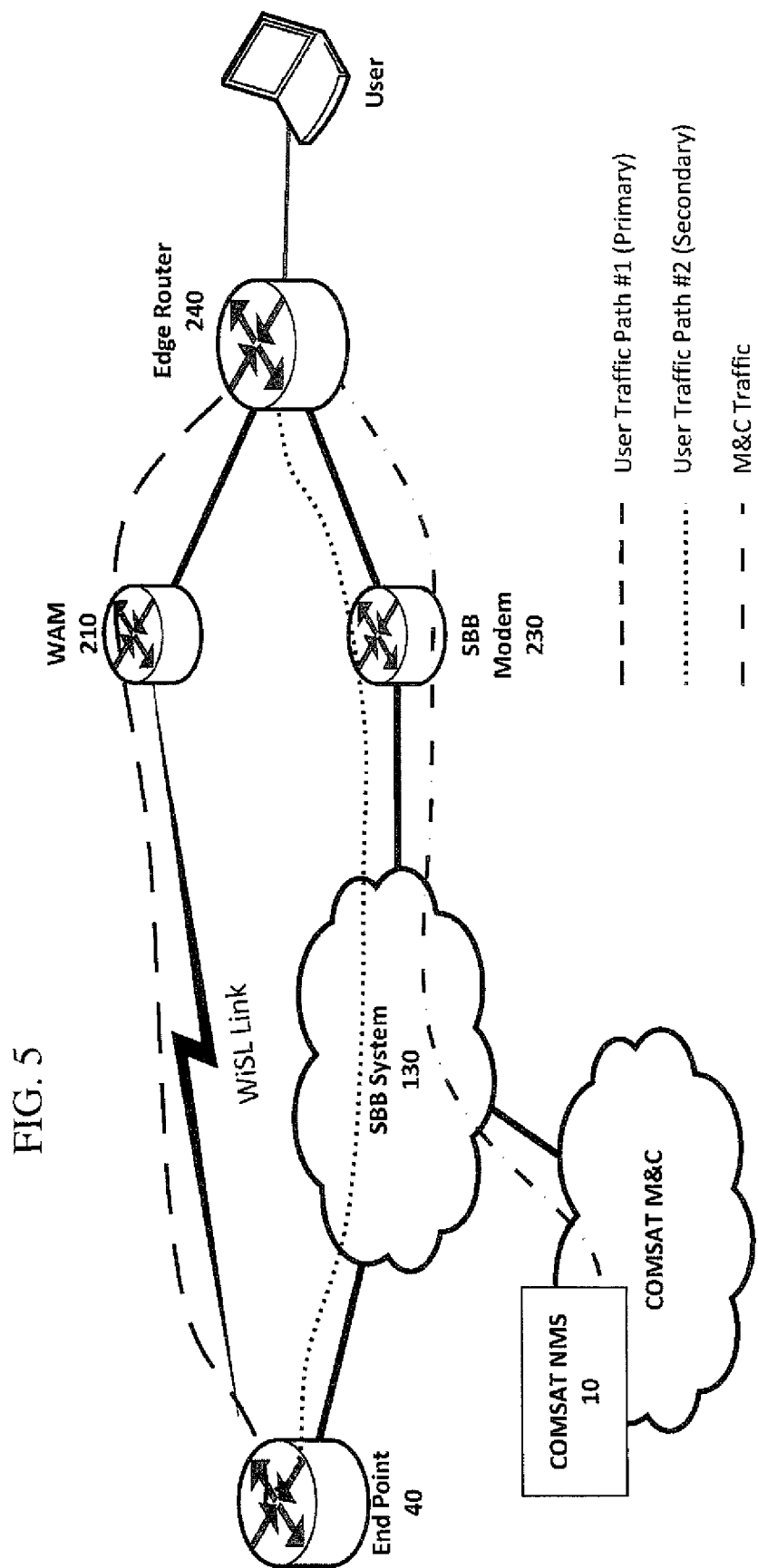
FIG. 5 shows a sample diverse-path network configuration for user traffic for used with the aeronautical network architecture schematic of FIG. 1.

FIG. 5 shows a sample diverse-path network configuration for user traffic for used with the aeronautical network architecture schematic of FIG. 1. COMSAT's MPLS network is built to route all traffic privately. Referring to FIGS. 1 and 5, two independent routes can be established from the remote. The M&C (remote management and control) link connects the WAM 210 with the Network Management System 10 via a static encrypted route over SBB (Swift Broadband Background IP). The SBB modem 230 can be assigned a static IP address to allow communication with the NMS.

A second route can be established for user traffic, flowing between the Data port of the WAM 210, via WiSL link, to the customer end point. The WAM 210 and teleport modems 110 are configured in bridge mode, forwarding packets in and out of the satellite link. The IP addressing can be set by the routers in the terrestrial network; routable subnets can be assigned statically or via DHCP (Dynamic Host Configuration Protocol) to the internal network of the aircraft 200 by the gateway router at the teleport 100. User data can use WiSL as the primary link (when available) and SBB as backup, usually during transit.

With the proper aircraft routing configuration, the SBB link can also be used for user traffic during transit (non-WiSL coverage), or as forward link when WiSL is configured in simplex mode. FIG. 5 also shows a sample network configuration where user traffic has two routes built on least-cost routing, with primary (preferred) via WiSL when available, and secondary via SBB.

The Global Resources Manager 30 and Network Management System 10 GRM-NMS interface acts as a server (GRM) client (COMSAT NMS) interface. The COMSAT NMS 10 can interact with the GRM 30 and the modems 210, 110 (aircraft and teleport). The SBB terminal 230 can keep constant communication with an Inmarsat Radio Access Network (RAN) which validates that the mobile terminal 230 is online and active. Via SBB registration, the RAN knows which beam the aircraft is actively using. Through the RAN connection with the GRM, the system 10 knows that the aircraft 200 has entered the "WiSL beam" and when polled, notifies the NMS to enable the WiSL carriers.

Referring to FIGS. 1 and 5, the Network Management System 10 NMS server can be built as a stand-alone system and can be physically located at a teleport location, such as but not limited to COMSAT's Southbury Teleport. The NMS can operate in a special partition of COMSAT's MPLS (Multiprotocol Label Switching) network, configured with the proper routing and security to connect with Inmarsat GRM (Global Resource Manager) and SBB (Swift Broadband) backbone network to interface with the modems (aircraft and teleport). The NMS 10 can be built using a relational database, specifically built to enable full control of the spectrum, the remote terminals and ground infrastructure, can be used to maintain positive control of the system all the time, and allow users to share common resources for multiple remotes.

The Network Managing System 10 can include the features of lease inventory, remote inventory, and remote status, which can be controlled remotely through a standard desktop computer with a standard Internet browser. For security reasons the computer needs to be configured isolated from other parts of the network and installed in a private area at the COMSAT NOC 20.

The following are the features built in the system.

For lease inventory, the Network Management System 10 can have a management database that allows an administrator to create, modify and remove leases on any satellite region. The leases can include single beams or clusters of beams that operate with dedicated spectrum.

The database can associate each beam to satellite transmission and reception parameters. These parameters vary with mission and are obtained from an Inmarsat lease authorization certificate that can uploaded onto the NMS (Network Management System). A Private Key for each specific lease can also be uploaded, to allow for the NMS to properly translate the Lease Certificate from Inmarsat.

For the remote inventory feature, the user can add, remove and modify remote terminals in the system. A database can include the SIM (subscriber identification module) card, IMSI (International Mobile Subscriber Identity) number of the SBB terminal authorized to use the lease, the IP address assigned to the remote, and any details required for ongoing management and control of the aircraft equipment.

The NMS (Network Management System) 10 can provide the basic ability to associate different terminals with the appropriate lease, and assign parameters for each specific remote on the allocated Inmarsat-4 or Alphasat region and spot beam.

For the remote status feature, the NMS (Network Management System) 10 can provide the interfaces and software logic to query the WAM 210, teleport/SAS modem 110, and the GRM 30 database for near real-time terminal location and beam information and cross check this against lease information as provided. The NMS 10 can have an automated process to gather status and location from the Inmarsat core GRM (global resource management) 30. The Lease Certificate can be used to authenticate communications with the GRM 30. The NMS 10 can be configured to failover to the backup GRM in a different Inmarsat POP if the primary GRM fails. This process can be used by the NMS 10 to identify when the plane 200 is active, and whether it is in-transit or arrived at the beam where the WiSL lease is booked. The NMS performs the following functions:

i. Queries the GRM for the updates indicating that the aircraft has reached the target beam ID.
 ii. Determines which specific Tx/Rx frequencies to use based on the L-band beam ID.
 iii. Sends commands to the teleport modem and aircraft modem to tune these modems to communicate on the specific beam.
 iv. Terminate aircraft WiSL transmissions when the aircraft leaves the beam.

Referring to FIGS. 1 and 5, the NMS (Network Management System) 10 can repeat this cycle at a rate fast enough so that the aircraft will not fly out of the overlap of the egressing beam and incoming beam. The polling is configurable, by default be set to 10 seconds to work in conjuncture with SBB (Swift Broadband operating in either background IP or Streaming.

For service operations, the NMS (Network Management System) 10 can have the ability to schedule the activation of a lease and associate the lease parameters with aircraft and missions throughout the entire lifecycle of the lease. Lease parameters can include but not be limited to frequency of operation, power associated to the link, bandwidth of operation and IP addressing of the WiSL link.

To plan for a mission a lease has to be defined and associated with the plane or list of planes that are authorized to use the lease. Definitions of an Import lease, define a mission and Multiple Missions will now be described.

Import Lease Definition: A lease is defined by a unique lease ID; start/stop times; satellite coverage region; a number of beams; transmit and receive parameters including frequencies, data rates, modulation, and coding associated with each beam; and modem transmit power levels.

Define a Mission: A Mission is a process where an aircraft can be allowed operation in certain lease full-time or for a specified period of time.

Multiple Missions: A single lease will allow for multiple missions to take place, back-to-back, allowing for WiSL use to be transferred from one aircraft to another aircraft based on either a coordinated timetable from the NMS schedule or manual hand-over. The lease will only allow a single aircraft or mission to operate WiSL at any time.

For a Schedule Definition, the mission can be executed manually by the operators in the plane, or automated via schedule contained within the start/stop times of the lease for each aircraft.

FIG. 6 shows a sample screenshot of the NMS's scheduler. For automated operations:

i. The NMS can be configured with a scheduled activation or deactivation for mission planning purposes. The schedule can be associated to a remote or group of remotes, and assigned to specific lease or groups of leases.

ii. The NMS can manage and control the SAS (ground station) modems to the specific configuration needed for linking the specific remotes to each mission, based on the scheduler's parameters.

iii. The schedule helps users plan missions with priority and preemption of remotes when multiple remotes are competing for the same lease. This works when a remote needs to handover the mission to another remote, or a remote has priority over other remotes in the same beam.

Referring to FIGS. 1 and 5, for manual operations, the NMS (Network Management System) 10 can still associate the aircraft with a lease, but it does not associate the lease with the automated schedule. An operator onboard the aircraft 200 can also coordinate the activate/deactivate process on the WAM 210 to ensure the WiSL service will not interfere with an active link.

Using the WAM's graphical user interface (GUI), as described below and shown in a screen shot example in FIG. 7, operators can have full visibility of the identification name for the aircraft 200 that is currently operating with the WiSL lease, allowing for them to directly coordinate when the lease is handed over to another aircraft.

Persistent Management can also be achieved with the Network Management System (NMS) 10. Through the COMSAT MPLS (Multiprotocol Label Switching), the NMS can maintain positive control of the SAS (Satellite Access Station) (ground station) modems to ensure that they are properly configured and enabled/disabled when a remote becomes active/inactive.

When the remote becomes active, the NMS establishes persistent communication with the remote (WAM) via the control channel over SBB to monitor status and maintain positive control of the remote. When the remote arrives to the leased beam, the NMS automatically sends the required configuration parameters of the specific link to the remote, and maintains quality assurance of the process using SNMP (Simple Network Management Protocol) to ensure the communication is maintained during the entire mission.

Every modification and status change can be logged in the system for audit and troubleshooting purposes. During the entire mission, alarms and status indicators are captured and displayed. The system is hosted in a secure enclave, and protected from outside access for maximum OPSEC protection of the customer mission.

The NMS (Network Management System) can provide the ability to generate alarms or alerts using SNMP (trap) messages or emails to an external monitoring system for performance related issues as well as issues with command and control of the lease or inability of terminals to get the contracted lease services.

The Network Management System (NMS) 10 can include a status interface and configuration for operators. FIG. 7 shows a screen shot showing device status using the network management system of FIG. 1. The WAM's CPU (Central Processing Unit) can includes a GUI (graphical user interface) that communicates with the NMS (Network Management System) and conveys lease details to the end-user within an aircraft. By placing an "Edge router" between the WAM's M&C (remote management and control) port and the HSD, the GUI can be accessed from a laptop that is connected to the local network. Whether the plane is on the tarmac or airborne, the WiSL local operator uses the GUI to see the WAM's current status configuration and whether the lease is currently available or if another aircraft is currently using the service.

As shown below in FIG. 7, the GUI's status screen provides operational details related to the lease configuration, such as transmit and receive frequencies and IP addressing for WiSL user data. Furthermore, the GUI allows operators to cease WiSL functions and use the SBB connection freely as a standalone service. This feature is designed to allow users to maintain traffic flow via SBB, when an aircraft is not operating within the leased WiSL coverage area. Lastly the GUI allows limited control for configuring the WAM and HSD (high speed data transceiver), including:

Enabling or disabling the SBB session using PPPoE (point-to-point protocol over Ethernet)

Initiate HSD/SBB service type, such as Background IP or Streaming services

Changes to the APN

View or change the IP addressing for the WAM's CPU/M&C

Figure 8:
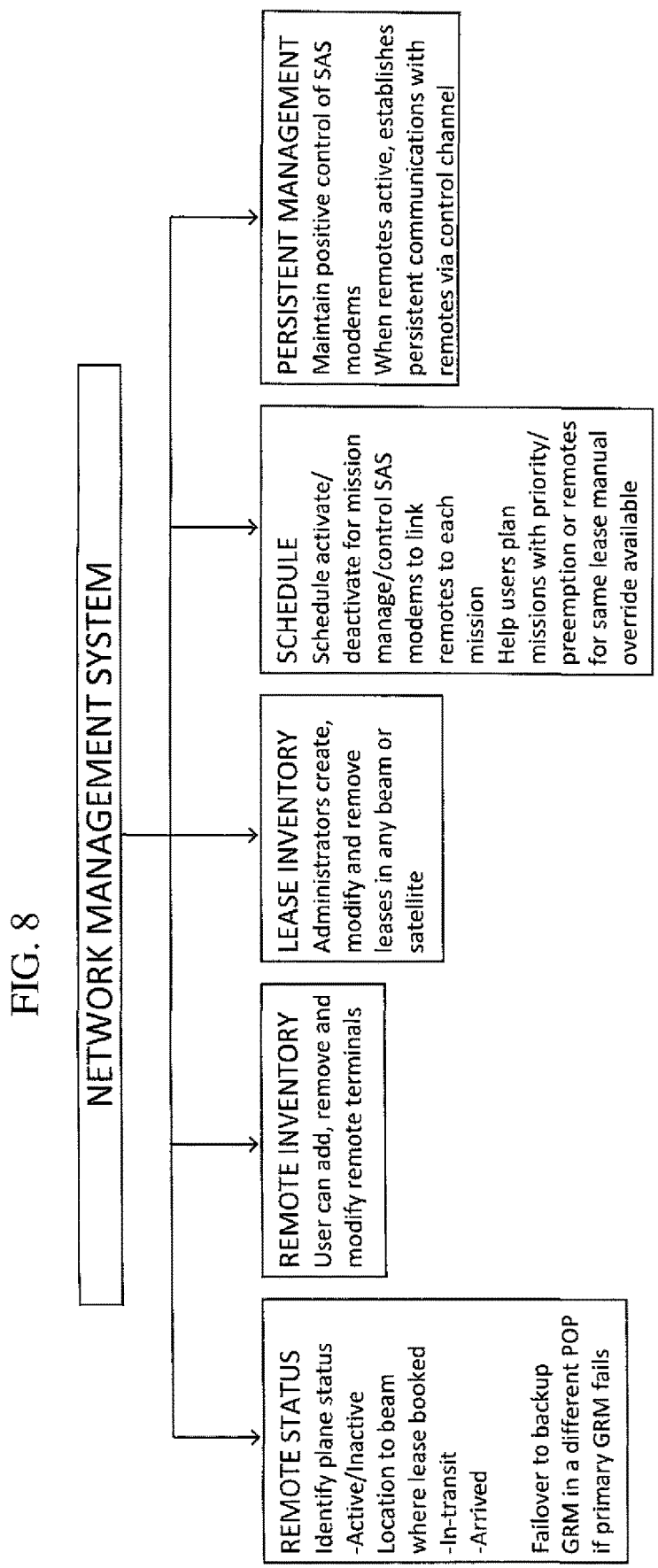
FIG. 8 is a flowchart of the Network Management System.

FIG. 8 is a flowchart of the main features of the Network Management System 10 used in FIGS. 1-7.

The term "approximately" can be +/−100 of the amount referenced. Additionally, preferred amounts and ranges can include the amounts and ranges referenced without the prefix of being approximately.

Although the invention describes applications for aircraft, the invention can have other applications, such as but not limited to maritime and land applications.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method for managing networks for wideband streaming services on an aircraft, comprising:

establishing a communication link between an antenna of the aircraft and a ground station via a satellite, said satellite having a satellite beam; and managing the communication link between the antenna, the satellite and at least one remote location in order to keep the communication link active while the aircraft travels between different satellite beams, wherein a new communication link with a target satellite beam is established while the communication link is allocated with the satellite beam.

2. The method of claim 1 wherein managing the communication link further comprises maintaining the communication link with the satellite beam until the aircraft leaves the satellite beam.

3. The method of claim 1 wherein managing the communication link further comprises completing the new communication link with the target satellite beam while the aircraft is within an overlap of the satellite beam and the target satellite beam.

4. The method of claim 1 wherein the managing the communication link further comprises:
    querying a global resource manager for updates indicating whether the aircraft reaches the target satellite beam;
    determining transmitting and receiving (Tx/Rx) frequencies to use based on the target satellite beam;
    sending commands to a teleport modem in the ground station and the antenna to tune the teleport and antenna to communicate on the target satellite beam; and
    terminating the communication link with the satellite beam when the aircraft leaves the satellite beam.

5. The method of claim 1 wherein the managing the communication link further comprises connecting the antenna with a network management system through management and control (M&C) link via a swift broadband (SBB) modem on the aircraft, wherein the SBB modem assigns a static IP address to allow communication with the network management system.

6. The method of claim 5 wherein the managing the communication link further comprises communicating through the M&C link in order to keep the communication link active while the aircraft travels between different satellite beams.

7. The method of claim 5 wherein the M&C link is used as a forward link for the communication link, wherein the forward link is provided with n×100 kHz, where n is a natural number.

8. The method of claim 1 wherein the satellite beam allocates multiple beams from the satellite, and the managing the communication link further comprises allowing the communication link to transit between any satellite beams.

9. The method of claim 1 wherein the managing the communication link further comprises providing for service operations to schedule activation of a selected lease with the aircraft.

10. A network system for providing wideband streaming services on an aircraft, comprising:
    a ground based network management system for managing a communication link between an antenna, a satellite having a satellite beam, and at least one remote location in order to keep the communication link with the satellite beam active while the aircraft travels between different satellite beams, wherein a new communication link with a target satellite beam is established while the communication link is allocated with the satellite beam.

11. The network system of claim 10 wherein the communication link with the beam is maintained until the aircraft leaves the satellite beam.

12. The network system of claim 10 wherein the new communication link with the target beam is completed while the aircraft is within an overlap of the satellite beam and the target satellite beam.

13. The network system of claim 10 wherein the management system performs:
    querying a global resource manager for updates indicating whether the aircraft reaches the target satellite beam;
    determining transmitting and receiving (Tx/Rx) frequencies to use based on the target satellite beam;
    sending commands to a teleport modem in the ground station and the antenna on the aircraft to tune the teleport and antenna to communicate on the target satellite beam;
    and terminating the communication link with the satellite beam when the aircraft leaves the satellite beam.

14. The network system of claim 10 wherein the antenna is connected with the network management system through management and control (M&C) link via a swift broadband (SBB) modem on the aircraft, wherein the SBB modem assigns a static IP address to allow communication with the network management system.

15. The network system of claim 14 wherein the M&C link is used for communications in order to keep the communication link active while the aircraft travels between different satellite beams.

16. The network system of claim 14 wherein the M&C link is used as a forward link for the communication link, wherein the forward link is provided with n×100 kHz, where n is a natural number.

17. The network system of claim 10 wherein the satellite beam allocates multiple satellite beams from the satellite, and the network management system allows the communication link to transit between any satellite beams.

18. The network system of claim 10 wherein the network managing system provides for service operations to schedule activation of a selected lease with the aircraft.

* * * * *